United States Patent
Lento

(10) Patent No.: US 6,634,075 B1
(45) Date of Patent: Oct. 21, 2003

(54) METHOD AND ARRANGEMENT IN CONNECTION WITH SECONDARY COATING LINE

(75) Inventor: Kyösti Lento, Vantaa (FI)

(73) Assignee: Nextrom Holding S.A., Ecublens (CH)

( * ) Notice: Subject to any disclaimer, the term of this patent is extended or adjusted under 35 U.S.C. 154(b) by 0 days.

(21) Appl. No.: 09/530,129
(22) PCT Filed: Nov. 9, 1998
(86) PCT No.: PCT/FI98/00864
§ 371 (c)(1),
(2), (4) Date: May 3, 2000
(87) PCT Pub. No.: WO99/24374
PCT Pub. Date: May 20, 1999

(30) Foreign Application Priority Data

Nov. 10, 1997 (FI) .................................................. 974185

(51) Int. Cl.⁷ .......................... B23P 17/00; B29D 11/00
(52) U.S. Cl. ................... 29/419.1; 29/421.1; 264/1.28; 264/1.29
(58) Field of Search .................. 29/419.1, 421.1, 29/429, 430; 264/1.28, 1.29

(56) References Cited

U.S. PATENT DOCUMENTS

| | | | | |
|---|---|---|---|---|
| 4,446,686 A | * | 5/1984 | Panuska et al. .................. 57/6 |
| 4,585,406 A | * | 4/1986 | Ravela ........................ 425/113 |
| 4,728,470 A | * | 3/1988 | Einsle et al. ............... 264/1.29 |
| 4,861,515 A | | 8/1989 | Minamisawa et al. |
| 4,861,525 A | * | 8/1989 | Oestreich ................... 264/1.29 |
| 4,893,998 A | | 1/1990 | Schlaeppi et al. |
| 5,372,757 A | * | 12/1994 | Schneider .................. 264/1.28 |
| 5,658,598 A | * | 8/1997 | Veijanen ..................... 425/113 |
| 5,676,892 A | * | 10/1997 | Kertscher .................. 264/1.28 |
| 5,830,304 A | * | 11/1998 | Priesnitz et al. ............. 156/166 |
| 5,916,495 A | * | 6/1999 | Nonaka et al. ............. 264/1.24 |
| 5,938,987 A | * | 8/1999 | Paivinen ..................... 264/1.28 |
| 6,054,070 A | * | 4/2000 | Tokairin et al. ............ 264/1.28 |
| 6,066,275 A | * | 5/2000 | Robinson et al. .......... 264/40.1 |
| 6,327,767 B1 | * | 12/2001 | Puhakka et al. .......... 29/407.01 |
| 6,500,365 B1 | * | 12/2002 | Cecchi et al. ............... 264/1.28 |

FOREIGN PATENT DOCUMENTS

| | | | |
|---|---|---|---|
| DE | C3 27 57 786 | 6/1979 | |
| DE | C2 32 39 024 | 4/1984 | |
| DE | C2 34 25 649 | 1/1986 | |
| DE | A1 3822566 | 1/1990 | |
| EP | A2 0 286 819 | 10/1988 | |
| GB | 2141557 | * 12/1984 | ............ G02B/5/14 |
| WO | WO 95/18396 | * 7/1995 | ............ G02B/6/44 |
| WO | WO A1 97/02503 | 1/1997 | |
| WO | WO 99/24374 | * 5/1999 | |

* cited by examiner

Primary Examiner—Gregory Vidovich
Assistant Examiner—Essama Omgba
(74) Attorney, Agent, or Firm—Oliff & Berridge, PLC

(57) ABSTRACT

The invention relates to a method and an arrangement in connection with a secondary coating line, in which method a fiber, fibers or fiber bundles are unwound from payoff reels (1) and guided to a press (4) by which a secondary sheath is formed around the fiber(s) or the fiber bundles and grease is fed into the secondary sheath, and in which method the assembly formed by the secondary sheath and the fiber(s) or the fiber bundles is pulled at a constant rate and low tension to a winding device (15) through cooling means (5, 6). In order to control the difference in length between the fibers and the secondary sheath, the difference in length between the fibers and the secondary sheath is arranged to be adjusted by adjusting fiber tension by moving the fixing point between the fibers and the secondary sheath along a straight part formed in the relaxation part by using wheel structures (8, 10).

5 Claims, 1 Drawing Sheet

METHOD AND ARRANGEMENT IN CONNECTION WITH SECONDARY COATING LINE

Figure 1:
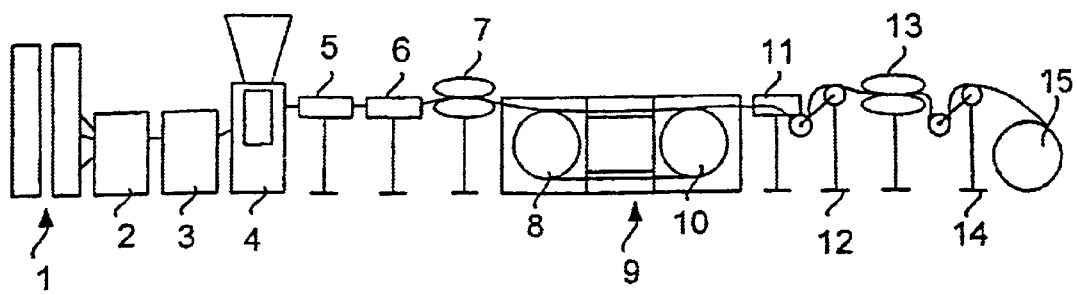

The invention relates to a method in connection with a secondary coating line, in which method a fibre, fibres or fibre bundles are unwound from payoff reels and guided to a press by which a secondary sheath is formed around the fibre(s) or the fibre bundles and grease is fed into the secondary sheath, and in which method the assembly formed by the secondary sheath and the fibre(s) or the fibre bundles is pulled at a constant rate and low tension to a winding device through cooling means. The invention further relates to an arrangement in connection with a secondary coating line.

At present, the methods and arrangements described above are well known in the cable industry. Examples of known solutions include the solutions disclosed in U.S. Pat. No. 4,893,998, DE patents 27 57 786, 32 39 024 and 34 25 649, DE published application 38 22 566 and Fl patent 94989.

One of the most important characteristics of a secondary coating line is to be able to control the difference in length between a fibre and a secondary sheath and to achieve a stable secondary coating after the process. Particularly the extent of after-contraction taking place after cooling of a coating of an S-Z stranded and straightened construction affects the quality of the final product, in other words the optic cable. In principle, the previously known solutions are satisfactory in the above respect, but progress in technology has led to increasingly higher rates, which, in turn, has resulted in dramatically greater line lengths. The great line lengths take up much space, which makes installation more difficult when a line is being renovated, for example, and thus increases the costs.

An object of the invention is to achieve good control and adjustment of the difference in length at rates higher than the current ones and small after-contraction of secondary coating without substantially increasing the line length. This is achieved by the method and arrangement of the invention. The method of the invention is characterized in that the difference in length between the fibre(s) or the fibre bundles and the secondary sheath is adjusted by adjusting fibre tension by moving the fixing point between the fibre(s) or the fibre bundles and-the-secondary sheath along a straight part formed in the relaxation part. The arrangement of the invention, in turn, is characterized in that the difference in length between the fibre(s) or the fibre bundles and the secondary sheath is arranged to be adjusted by adjusting fibre tension by moving the fixing point between the fibre(s) or the fibre bundles and the secondary sheath along a straight part formed in the relaxation part by using wheel structures (8, 10).

An advantage of the invention is that the process can be controlled in an extremely inexpensive way at line rates higher than the current ones and the line length can be maintained at the current level. Another advantage of the invention is that the control of the difference in length enables the current adjustment based on tension adjustment to operate properly. Another advantage of the invention is its simplicity; the invention is inexpensive to implement and use.

Figure 2:
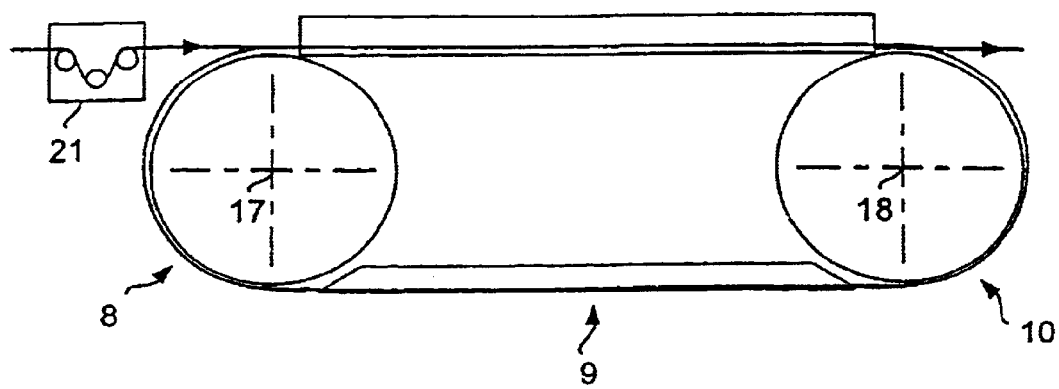
Figure 3:
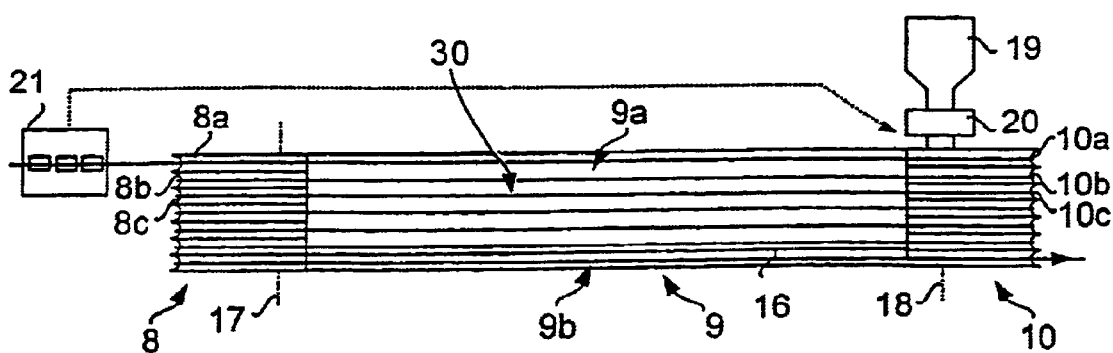

The invention will be described in closer detail in the following by means of an example of a preferred embodiment shown in the accompanying drawing, in which FIG. 1 is a schematic view of a secondary coating line in accordance with the invention, FIG. 2 is a side view of a detail of the line in accordance with FIG. 1, and FIG. 3 is a view of a detail of FIG. 2 seen from above.

FIG. 1 schematically shows a secondary coating line in which the method in accordance with the invention is utilized. Reference number 1 in FIG. 1 refers to fibre payoffs, which can be current motorized ones equipped with pneumatic tension adjustment. Reference number 2 refers to a process tension adjusting device, which can be an FXL device also currently used, for example. Feedback to the adjustment can be derived from the on line bias measurement. A fibre bundling device is referred to by reference number 3. The fibre bundling device 3 is not always necessary, but it can be used in connection with thick-fibre cables. Reference number 4 in FIG. 1 refers to a press and grease feed. A tubular secondary coating is formed around a fibre, fibres or fibre bundles by means of the press. Some grease types require grease preheating in connection with the grease feed into a secondary sheath taking place in the press. Reference number 5 in FIG. 1 refers to an adjustable cooling groove structure, which can be a motorized, mobile groove structure known per se, for example. Reference number 6 refers to a fixed cooling groove with an adjustable temperature, the length of which is defined as short as possible, provided however that the maximum product rate is achieved in such a manner that the secondary sheath is not modified in a pulling device 7 after the groove. The temperature of a front groove can be used to affect the relaxation sensitivity of the secondary sheath, which is released in a relaxation part after the pulling device 7. The pulling device 7 is a constant rate pulling device, which can be a belt drive device, for example. The part after the pulling device 7 is a relaxation zone and the part before it is for solidifying the secondary sheath before the pulling device 7.

Reference numbers 8 and 10 in FIG. 1 refer to auxiliary pulling devices by which the secondary sheath tension is kept as low as possible in the relaxation zone. The secondary sheath and the fibres contained in it wind the required number of winds through wheels that are separately pivoted and equipped with a slipping auxiliary drive. The above points will be discussed in closer detail later. A two-layer cooling groove structure 9 provided with a cool and a hot module part in both layers is arranged in connection with the auxiliary pulling devices 8, 10. The length of the hot module part, which means that the temperature exceeds the crystallization temperature of plastic, which is about 60° C. to 80° C., is determined as a function of the maximum product/rate in such a manner that the product has time to almost each the full final length. The slipping auxiliary drive can be implemented by means of a viscous clutch from the same axis. The length of the secondary sheath varies at different winds and it is sufficient that the pulling tension exceeds the frictional and bending forces that appear in said part. The groove structure 9 between the auxiliary pulling devices 8, 10, in other words idler wheels, can be divided into a hot part and a cold part seen from the direction of motion of the fibre in such a manner that the first winds occur in the hot part and the last one in cold water.

Reference number 11 in FIG. 1 refers to an additional cooling part that may possibly be needed. If the power of the two-layer cooling groove structure is insufficient, a cold straight part can be added to the line. Reference number 12 refers to a line tension accumulator which adjusts the rate of a tension pulling device 13 at the end of the groove. The tension here only barely suffices to extract the product emerging from the line from the groove. Since line tension should be lower than winding tension, the tension of a winder 15 must be adjusted by a separate control 14.

The process in accordance with the invention can be described in principle in the following manner. Fibres are unwound from a reel CMP or a corresponding payoff stand at a low tension, which is determined by the requirements of appropriate unwinding from the reel. The pulling tension before the press 4 should be adjustable and identical for all fibres. It is possible to derive the tension adjustment feedback from the on line bias measurement/adjustment. The secondary sheath and the fibres contained in it are pulled from the press 4 by the constant rate pulling device 7. The fixing point of the fibres to the secondary sheath rate should be situated in the straight part of the cooling groove after the press. If necessary, the location of the fixing point can be moved forward, farther away from the press 4 by heating the grease.

In accordance with the essential idea of the invention, the difference in length between the fibre(s) or the fibre bundles and the secondary sheath is adjusted by adjusting fibre tension by moving the fixing point between the fibre(s) or the fibre bundles and the secondary sheath to a relaxation part in the straight part that has been formed. The basic idea of the invention is that the fixation, in other words the locking, between the fibre(s) and the secondary sheath does not occur at a particular fixation point but along a particular distance. The later the fibre is fixed to the rate of the tube, the shorter the excess length of the fibre. The elongation of the fibre in the first part enables the excess length to be shortened. About 50% of the fibre proof test level should not be exceeded at any point of the process, however. In the example of the figures the straight part of the relaxation part mentioned above is formed by means of two wheel structures 8, 10 arranged at a distance from each other and a groove plate 9 arranged between them. FIGS. 2 and 3 show views of the above structure on a larger scale and seen from different directions. The groove plate has a plurality of cooling grooves 30. The groove plate 9 is divided into a hot part 9a and a subsequent cold part 9b seen from the direction of motion as described above. The division is implemented by means of a partition 16 and fluids of different temperatures arranged in the above groove parts 9a and 9b. Seen from the direction of motion, the first cooling part is lukewarm. The idea is that the plurality of grooves 30 are arranged in a two-layer groove structure, such that the product first travels through the lukewarm cooling part and eventually through the colder part. The choice of temperatures depends on the desired location of the fixing point, which ultimately depends on the desired excess length for the fibre. The cooler the water into which the product is driven, the more relaxation-sensitive crystal structure the plastic obtains, in other words the contraction that is formed upon relaxation is greater. In the relaxation zone the temperature of the cooling water should exceed the crystallization temperature of plastic (BPTP about 750°). Higher temperature speeds up the contraction process. The latter cooling part is colder than the first one. If a stable product, in other words a product in which a secondary coating tube remains as unchanged as possible after manufacturing, is desired, the relaxation time should be sufficiently long. Furthermore, the overall process is thus at its stablest.

Since the contraction of the secondary sheath is substantially affected by its tension in the relaxation part, the tension should be kept as low as possible over the entire distance of the part after the constant rate point. The secondary sheath contracts along the entire distance of the relaxation zone, so the different points of the zone cannot be interconnected in a fixed manner by using the same idler wheel at different winds, for example. Hence, the wheel structures 8, 10 are formed from separate wheels 8a, 8b, 8c, etc., and 10a, 10b, 10c, etc. correspondingly, pivoted on the same axis 17, 18. At least one of the wheel structures 8, 10 should be a driving one. In the example of the figures the wheel structure 10 is rotated by a motor 19. The motor 19 can be an electric motor, for example. The tension on the secondary sheath caused by the driving wheel structure 10 should be as low as possible. The tension should be barely sufficient to exceed the frictions and forces caused by bending before the pulling point. Such pulling can be implemented by a slipping power transmission, through a viscous clutch 20, for example. The standard value for the viscous clutch 20 can be obtained by a tension measurement device 21 as described in FIG. 3. By means of the viscous clutch, one axis can be controlled by one drive and the limited force can be separately transmitted to each wheel 10a, 10b, etc. The rate of each wheel can vary, depending on the contraction of the secondary sheath. Since the tension of take-up winding should be significantly higher than the tensions used in the rest of the process, the winding tension must be separately adjusted after a last pulling device 13.

The above application example of the invention is by no means intended to restrict the invention, but the invention can be freely modified within the scope of the claims. It is thus obvious that the details of the arrangement in accordance with the invention may slightly differ from the ones shown in the figures since various solutions are feasible. The number of separate wheels of the wheel structures, for example, is not restricted to the number shown in the figure, but the number of wheels pivoted to the same axis can vary freely as required.

What is claimed is:

1. A method for forming a secondary sheath around a fibre, fibres or fibre bundles in a secondary coating line, comprising:

unwinding fibre, fibres or fibre bundles from payoff reels;

guiding the fibre, fibres or fibre bundles to a press by which a secondary sheath is formed around the fibre(s) or the fibre bundles and grease is fed into the secondary sheath;

pulling the secondary sheath and the fibre(s) or the fibre bundles at a constant rate and low tension through cooling means to a winding device;

moving a fixing zone between the fibre(s) or the fibre bundles and the secondary sheath along a straight path formed in a relaxation part in the secondary coating line to compensate for the difference in length between the fibre(s) or the fibre bundles and the secondary sheath, the relaxation part being a portion of the cooling means in which tension on the secondary sheath is relaxed, the straight path being formed by a two-layer cooling groove structure arranged between two wheel structures.

2. A secondary coating line, comprising:

means for unwinding a fibre, fibres or fibre bundles from payoff reels;

means for guiding the fibre(s) or the fibre bundles to a press, the press forming a secondary sheath around the fibre(s) or the fibre bundles and feeding grease into the secondary sheath;

pulling means for pulling the secondary sheath and the fibre(s) or the fibre bundles at a constant rate and low tension through cooling means to a winding device; and wheel structures that compensate for a difference in length between the fibre(s) or the fibre bundles and the secondary sheath by adjusting fibre tension by moving a fixing zone between the fibre(s) or the fibre bundles and the secondary sheath along a straight path formed between the wheel structures in a relaxation part in the secondary coating line, the relaxation part being a portion of the cooling means in which tension on the secondary sheath is relaxed, the straight path between the wheel structures being formed by a two-layer cooling groove structure.

3. The secondary coating line of claim 1, wherein grooves of the two-layer cooling groove structure are divided into a hot part and a subsequent cold part as seen from the direction of motion of the fibre(s) or the fibre bundles.

4. The secondary coating line of claim 2, wherein the wheel structures are formed from separate wheels arranged on the same respective axis.

5. The secondary coating line of claim 4, further comprising:
a slipping clutch structure, wherein
one of the wheel structures is a driving wheel structure, and drive generated by the one of the wheel structures is transmitted to each wheel through the slipping clutch structure.

* * * * *